US005345033A

United States Patent [19]

McLaughlin

[11] Patent Number: 5,345,033

[45] Date of Patent: Sep. 6, 1994

[54] METHOD FOR THE NEUTRALIZATION OF HAZARDOUS MATERIALS

[75] Inventor: William J. McLaughlin, Claremont, Calif.

[73] Assignee: Toxco, Inc., Claremont, Calif.

[21] Appl. No.: 995,802

[22] Filed: Dec. 23, 1992

[51] Int. Cl.[5] .......... B09B 1/00

[52] U.S. Cl. .......... 588/249; 62/64; 405/128; 405/130

[58] Field of Search .......... 405/128, 129, 130, 258; 588/249; 62/64, 66

[56] References Cited

U.S. PATENT DOCUMENTS

| | | | |
|---|---|---|---|
| 3,943,722 | 3/1976 | Ross | 405/130 |
| 4,129,431 | 12/1978 | Ross et al. | 405/130 X |
| 4,157,016 | 6/1979 | Wendt et al. | 405/130 X |
| 4,974,425 | 12/1990 | Krieg et al. | 405/130 X |
| 5,025,632 | 6/1991 | Spritzer | 62/64 |
| 5,066,166 | 11/1991 | Hansen | 405/128 |

*Primary Examiner*—Dennis L. Taylor
*Attorney, Agent, or Firm*—Fulwider Patton Lee & Utecht

[57] ABSTRACT

A method for neutralizing hazardous materials wherein the material and if applicable, the device within which such material is contained, is first cooled to substantially sub-ambient temperatures. The material is then safely extractable from such device and exposed to the appropriate reactants in order to form benign products. Most of the hazards associated with accessing, handling, and reacting these materials are thereby eliminated and such is achieved in relatively economical manner.

17 Claims, No Drawings

METHOD FOR THE NEUTRALIZATION OF HAZARDOUS MATERIALS

BACKGROUND OF THE INVENTION

1. Field of the Invention

The present invention generally relates to the neutralization of hazardous materials. More particularly, it pertains to methods of handling and processing various chemical compounds and biological agents as encountered in many different forms and applications.

2. Description of Related Art

A wide variety and tremendous amounts of extremely hazardous materials are in existence today. Such materials include by-products of industrial processes and materials associated with spent or obsolete hardware related to for example power, propulsion, or weapons systems. Hazardous materials associated with munitions often involve explosives which renders their handling for purposes of neutralization exceptionally difficult and dangerous.

Warehousing or otherwise stockpiling such materials may offer an apparently relatively safe course of action, but such disposition is nonetheless only a temporary one that must ultimately be addressed. Political pressures to deal with such problems sooner rather than later imparts a degree of urgency to the development of an effective and economical neutralization method. The recent developments respecting post-Cold War disarmament has rendered this problem especially acute as many hundreds of thousands of tons of conventional, chemical, and biological weaponry are now slated for neutralization and destruction under international agreement.

The ultimate solution is to neutralize the hazardous material in a manner that allows for its return to the environment in a thoroughly benign state. Current approaches to such a neutralization strategy typically involve high temperature incineration techniques. While this provides an effective means for dealing with some materials, it is by no means applicable to all materials, sometimes creates pollutants of even greater concern, may involve substantial safety risks, and when considering the cost of facilities necessary for the practice of such methods as well as the amounts of energy consumed by the process, high temperature incineration often comprises a prohibitively costly approach.

Specific disadvantages inherent in incineration techniques are exemplified by materials that yield combustion products that are in and of themselves hazardous and difficult to neutralize. Further, highly explosive materials may be ill-suited to exposure to elevated temperatures as reactions may proceed at uncontrollable rates. High temperature incineration can be very costly as it has been estimated that the neutralization of the tens of thousands of tons of a particular chemical agent used in chemical weapons currently slated for destruction by such method would cost many hundreds of thousands of dollars per ton. The destruction of lithium boilers used to propel torpedoes poses special problems unaddressable by high temperature incineration as the lithium is sealed within stainless steel containers and any contact with heat, oxygen, nitrogen, carbon dioxide, and/or water would result in an explosion.

The need therefore exists for a method for neutralizing a broad range of hazardous materials in a safe and economic manner. Such method must further provide for the processing of such materials in any of the variety of forms and environments in which they may be encountered.

SUMMARY OF THE INVENTION

The present invention provides a method for neutralizing hazardous materials while overcoming the above set forth shortcomings and disadvantages of the prior art. Neutralization is achieved in a safe and economic manner and the method is adaptable to a wide variety of biological and chemical materials encountered in a variety of forms.

In general, the present invention calls for the critical handling, accessing and reacting of various hazardous materials to be undertaken at extremely low temperatures. This provides the simultaneous effect of eliminating the possibility of explosion, availing a variety of mechanical means to be employed in accessing such materials within the containment systems in which they may be encountered, greatly reducing diffusion rates to help prevent the escape of such materials while being processed and allows particularly effective reactants to be employed, the use of which may be contraindicated at ambient temperatures. The reactivity level of chemicals is typically a function of absolute temperature and most activity rates are reduced by about 50% for every 10° C. of temperature reduction. Consequently, reactivity levels at cryogenic temperatures can be expected to be about 1/2000 of what they are at normal room temperatures.

As per the method of the present invention, the temperature of the hazardous material to be neutralized is first substantially reduced, preferably to cryogenic levels, after which the material is reacted with an appropriate reactant. It has further been found that by adopting this approach for the neutralization of munitions and thereby initially cooling down for example an entire artillery shell or land mine containing a chemical agent, the risk of explosion is reduced or eliminated. Additionally, the ductility of the casing is substantially reduced to allow it to be readily sheared or broken open at which point the exposed chemical agent can safely be reacted with a particularly effective reactant. Such reactant when used at room temperature may cause chemical reactions to proceed at uncontrollable rates and may generate hazardous gaseous products. Similarly, the application of the present invention allows sealed lithium or sodium reactors to be breached and their contents neutralized at a minimal cost and no danger of explosion.

Sufficiently low temperatures are achieved by submersing the subject hazardous material or hazardous material containing device in cryogenic fluids such as liquid argon or liquid nitrogen for sufficient periods of time. Neutralization procedures are subsequently conducted either while the material is still submersed in the cryogenic fluid or shortly after extraction therefrom.

These and other features and advantages of the present invention will become apparent from the following detailed description of preferred embodiments which illustrate by way of example the principles of the invention.

DETAILED DESCRIPTION OF PREFERRED EMBODIMENTS

As is summarized above, the present invention provides for the neutralization of hazardous materials by handling, accessing and reacting such materials at substantially sub-ambient temperatures. The reduced temperatures' effect on reactivity rates minimizes or altogether eliminates the risk of explosion, allows reactions to proceed at very controllable rates and additionally renders containment vessels and casings more easily penetrable in order to expose the hazardous materials contained therein.

Chemical and biological agents are often contained within munitions such as artillery shells, rockets, land mines, or aircraft-deliverable bombs. The munitions casings are almost always metal or plastic and are not always easily separably from an explosive associated therewith. In accordance with the present invention, the entire device containing the hazardous material to be neutralized is submersed in liquid nitrogen or argon for a period of time sufficient to cool the entire device and its contents down to about −300° F. At this temperature, the ductility of the metal or plastic casing is sufficiently reduced to allow the casing to be easily mechanically sheared or broken open. The agents can then be safely reacted with appropriate reactants to create benign products. For instance, mustard gas or nerve agent VX can then be reacted with hypochlorite, while GA or GB agents can be reacted with sodium hydroxide to form a series of nontoxic compounds. The extremely low temperatures at which these reactions are conducted effectively prevents the diffusion and escape of any of the hazardous agents. The method of the present invention not only provides a safe means for neutralizing these materials, but is able to achieve this at a cost of about an order of magnitude less than currently employed conventional high temperature incineration techniques.

Lithium boilers used to propel some torpedoes pose an especially difficult problem vis-a-vis neutralization. Sealed within stainless steel tubing with Hastelloy end caps is lithium metal which, when warm, reacts exothermally with oxygen, nitrogen, carbon dioxide and/or water. Such reaction in a partially sealed container results in an explosion. Attempts to breach such boilers in a conventional manner inevitably results in partially sealed containment, heat and contact with one or more of the deleterious reactants and hence an explosion. Neutralization of such devices has therefore to date not been undertaken on a significant scale. By submersing the boiler in chemically inert liquid argon to lower the lithium's temperature to about −300° F., the boiler can be mechanically sheared open to gain access to the lithium. In its unconfined state, there is no risk of explosion and at such low temperatures, its reaction with water proceeds at a slow and controllable rate to yield lithium hydroxide. Lithium hydroxide is subsequently easily converted to lithium carbonate, a benign substance.

Many other hazardous materials and hazardous material containing devices are well suited for neutralization according to the method of the present invention. In addition to munitions, chemical batteries, emergency power system, power systems for underwater devices and computer power systems are safely neutralized by first reducing their temperature to cryogenic levels before accessing and reacting the hazardous material with reactants selected to form a substance in a readily useable form or a benign substance safely returnable to the environment.

While a particular form of the invention has been illustrated and described, it will also be apparent to those skilled in the art that various modifications can be made without departing from the spirit and scope of the invention. Accordingly, it is not intended that the invention be limited except by the appended claims.

What is claimed is:

1. A method for neutralizing a hazardous material, comprising the steps of:
   cooling said hazardous material to substantially below room temperature; and
   reacting said cooled material with one or more reagents selected to yield non-hazardous or less hazardous products.

2. The method of claim 1 wherein said hazardous material is cooled by contact with a cryogenic fluid.

3. The method of claim 2 wherein said hazardous material is cooled by submersion in a cryogenic fluid.

4. The method of claim 3 wherein said cryogenic fluid comprises a liquid argon.

5. The method of claim 3 wherein said cryogenic fluid comprises liquid nitrogen.

6. A method for neutralizing hazardous materials disposed within a containment vessel, comprising the steps of:
   cooling said containment vessel to substantially below room temperature such that said hazardous material contained therein is similarly cooled to below room temperature;
   opening said cooled vessel to expose said hazardous material; and
   reacting said cooled material with one or more reagents selected to yield non-hazardous or less hazardous products.

7. The method of claim 6 wherein said containment vessel is cooled by contact with a cryogenic fluid.

8. The method of claim 6 wherein said containment vessel is cooled by submersion in a cryogenic fluid.

9. The method of claim 8 wherein said cryogenic fluid comprises liquid argon.

10. The method of claim 8 wherein said cryogenic fluid comprises liquid nitrogen.

11. A method for neutralizing hazardous material contained within munitions, comprising the steps of:
    cooling said munitions to substantially below room temperature such that said hazardous material contained therein is similarly cooled to substantially below room temperature;
    mechanically shearing said munitions so as to expose said hazardous material; and
    reacting said hazardous material with reagents selected to yield non-hazardous or less hazardous products.

12. The method of claim 11 wherein said munitions are cooled by contact with a cryogenic fluid.

13. The method of claim 12 wherein said munitions are cooled by submersion in a cryogenic fluid.

14. The method of claim 13 wherein said cryogenic fluid comprises a liquid argon.

15. The method of claim 13 wherein said cryogenic fluid comprises liquid nitrogen.

16. A method of neutralizing lithium contained within a lithium boiler, comprising the steps of:
    submersing said lithium boiler in liquid argon so as to cool said lithium contained therein to about −300° F.;
    shearing open said boiler to expose said lithium; and
    reacting lithium with water to form lithium hydroxide.

17. The method of claim 16 further comprising the step of chemically converting said lithium hydroxide to lithium carbonate.

* * * * *